March 10, 1970     W. T. COLE, JR., ET AL     3,500,033

CHEMILUMINESCENT EMERGENCY LIGHTING DEVICE

Filed Dec. 28, 1967     4 Sheets-Sheet 1

Inventors:
William T. Cole, Jr.
Benjamin K. Daubenspeck.
John H Lewis Jr.
John W. Phipps
by Nicholas Skovran
Attorneys

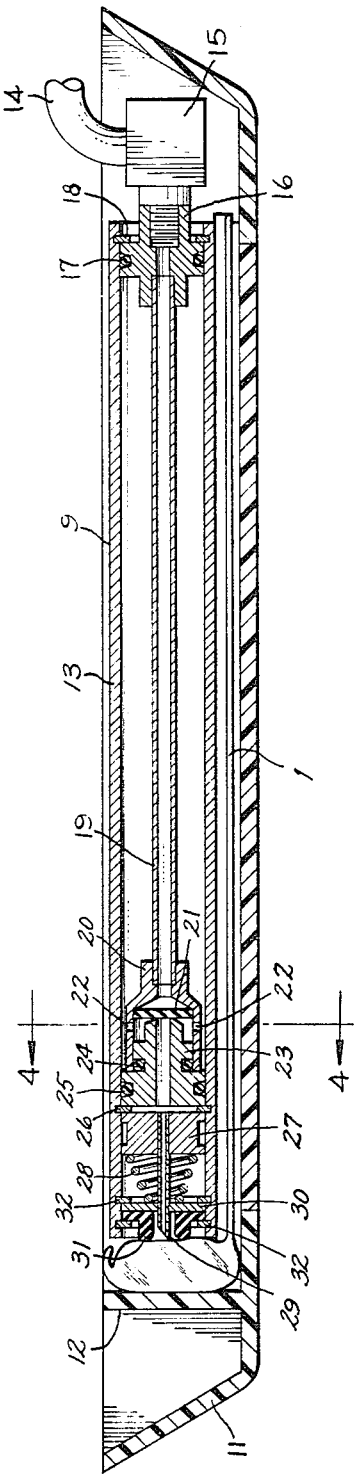

March 10, 1970  W. T. COLE, JR., ET AL  3,500,033
CHEMILUMINESCENT EMERGENCY LIGHTING DEVICE
Filed Dec. 28, 1967  4 Sheets-Sheet 3

Inventors:
William T. Cole Jr.
Benjamin K. Daubenspeck
John H. Lewis Jr.
John W. Phipps
by Nicholas Skovran
Attorneys.

United States Patent Office 3,500,033
Patented Mar. 10, 1970

3,500,033
CHEMILUMINESCENT EMERGENCY LIGHTING DEVICE
William T. Cole, Jr., Bridgeport, and Benjamin K. Daubenspeck, Stratford, Conn., assignors to Remington Arms Company, Inc., Bridgeport, Conn., a corporation of Delaware
Filed Dec. 28, 1967, Ser. No. 694,229
Int. Cl. F21v 9/16
U.S. Cl. 240—2.25                    10 Claims

ABSTRACT OF THE DISCLOSURE

An emergency lighting device comprising a flexible envelope containing a filler adapted to chemiluminesce when exposed to air and apparatus adapted to admit air to the flexible envelope under various emergency conditions.

---

This invention relates to the use of chemiluminescent material similar to that disclosed in U.S. Patent No. 3,239,406, issued Mar. 8, 1966, to Donald D. Coffman and Hilmer E. Winberg, or to that disclosed in U.S. Patent No. 3,350,553, issued Oct. 31, 1967, to Edward T. Cline. The patents relate to the discovery that a multilayer or sandwich-like structure can be prepared in which a porous substance is impregnated with a chemiluminescent material and enclosed in a transparent or strippable envelope which may be perforated or removed to allow the access of air or other activating gaseous material to the chemiluminescent composition.

In one embodiment of the invention, emergency lighting panels may be prepared, which comprise envelopes of thin, transparent, air impervious plastic material containing an absorptive material such as a blotting paper, cloth or felt, which is impregnated with the chemiluminescent material and a transparent air permeable separator such as screen or coarse mesh which permits air to pass readily along the length of the envelope into contact with the chemiluminescent material. When such an envelope is perforated or when pressurized air is admitted thereto the panel becomes luminous and delivers useful light for a period on the order of one-half hour. Such panels themselves are not out invention but are the invention of those named in the patents above identified.

We have provided an adaptation of such panels, which facilitates the storage of such panels in a sealed condition and which, in conjunction with devices to be described below, permits the insertion of a hollow needle for practically instantaneous filling of the panel with air or other activating gaseous material. In a preferred embodiment the envelope has an auxiliary chamber in communication with the chemiluminescent material containing chamber and contained within the auxiliary chamber is a porous form-retaining body of a sponge-like or felted construction and of adequate stiffness to support a wall of the plastic envelope to permit an inflating needle to perforate the envelope from one side and of sufficient thickness to insure that the inflating needle does not penetrate the back surface of the panel. Thus, any gas delivered through the needle is retained and utilized within the panel.

In an adequate emergency lighting system it is, of course, desirable to provide an arrangement which will function when the emergency arises without any outside source of power and is in effect "fail safe." We have found it is desirable to provide a system in which all of the emergency lighting units are connected for pressurization and activation to a common source of pressurized air but have provided each emergency lighting panel with its own accumulator containing an adequate supply of air for activation of the panel.

Suitable control devices, to be later described in detail and located in each emergency lighting unit, are provided to cause the piercing of the panel with an inflating needle and to discharge thereinto the charge of air contained in the accumulator.

Most conveniently, the control devices are made responsive to depressurization of the lines interconnecting the source of air and the individual lighting units. This depressurization can be readily effected by manually operated valves located at any convenient point, by spring operated valves activated by any failure in an interconnected pneumatic, electric or hydraulic system, or by any failure in the interconnecting tubing.

One field in which the invention has great utility is in the emergency lighting of commercial aircraft, where such a system can readily be pressurized from a common source of air and the system can be arranged for manual actuation of depressurizing valves from the locations of pilots, engineers and stewardesses, and arranged for automatic actuation of depressurizing valves in the event of any failure in electric, hydraulic, pneumatic or other systems. Obviously, rupture of any part of the system as a result of a crash or emergency landing will also effect depressurization. Since each individual emergency lighting panel has in its own accumulator a charge of air adequate to light the panel for any usually required period, the system is fail-safe and operational in any emergency, including partial or total submersion in water.

In the accompanying drawings:

FIG. 3 is a longitudinal sectional view on the line 3—3 of FIG. 2.

FIG. 4 is a cross-sectional view on the line 4—4 of FIGS. 2 and 3.

Figure 1:
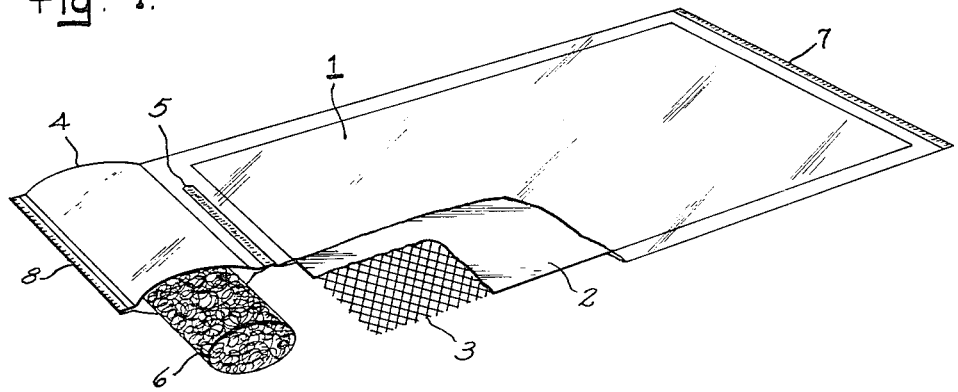
FIG. 1 is a pictorial view, with sections broken away, showing an exemplary lighting panel.

Referring to the drawings by reference characters, the lighting panel shown in FIG. 1 comprises an outer envelope 1 of transparent gas impervious plastic film, such as nylon, which is chemically compatible with the chemiluminescent material. Contained in the envelope is a layer of an absorbent material 2 such as fiber glass cloth or felted material also compatible with the chemiluminescent material and capable of absorbing a substantial quantity thereof. This absorbent material is preferably thin and transparent or translucent, so that light produced in the absorbed chemiluminescent material will be visible. To facilitate the admission and spreading of air into full contact with the chemiluminescent material, the absorbent sheet 2 is preferably separated, on one or both faces, from the plastic envelope by an open mesh netting 3 of nylon, fiber glass or other compatible material. At one end of the plastic envelope a separate compartment 4 is formed by a partial heat seal 5 between the two faces of the envelope and contained in this compartment but in communication with the section of the envelope containing the absorbent material 2 is a filler 6. This filler may comprise a plastic spongelike material, or a non-woven filament nylon mat, the principal requirements being chemical compatibility with the chemiluminescent material, negligible resistance to the flow of gases, and ability to retain its form under the application of such pressure as would be applied by the insertion of a hollow inflating needle through one side of the envelope.

Alternatively, the netting 3 may be formed to define a pocket to contain the filler 6, and the assembly inserted in the envelope without the use of the partial heat seal to define a compartment.

Since the envelope 1 is preferably formed of a flat tube of the transparent plastic material, the panel assembly may be completely closed by heat sealing the end of the tube as at 7 and 8. Before sealing, it is desirable to evacuate the tube and/or remove as much as possible of any inert gas with which the tube has been purged to remove air or other oxygen containing gas.

Figure 2:
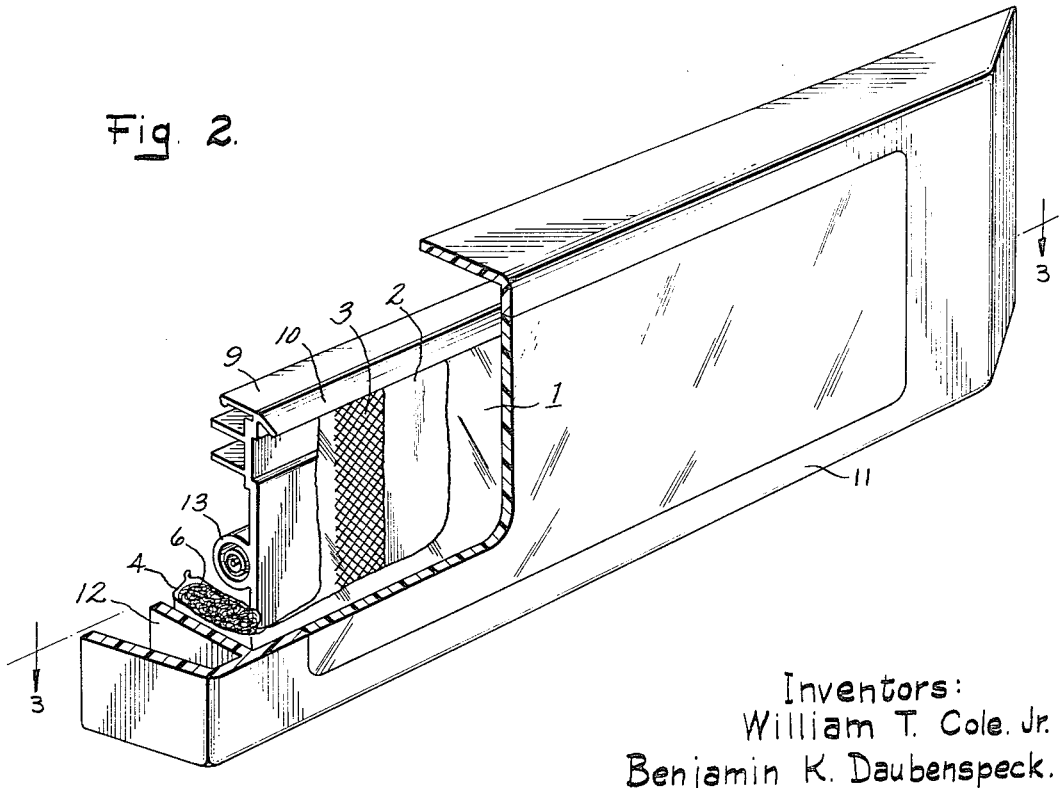
FIG. 2 is a plan view, with sections broken away, showing one embodiment of an emergency lighting fixture adapted to contain and actuate a panel such as that shown in FIG. 1.

In the preferred embodiment of panel supporting fixture illustrated in FIGS. 2, 3 and 4, a base 9 is formed of an extruded aluminum or suitable plastic material of a length equal to that of the active part of the lighting panel shown in FIG. 1 and is provided with flanges 10 to assist in positioning such a panel with the section thereof containing the form retaining filler 6 turned back at right angles into engagement with one end face of the base 9. A cover 11 is hingedly attached to the base 9 and may be closed thereover to contain the panel illustrated in FIG. 1 and preferably is provided with an abutment 12 which automatically folds back the section containing the form retaining filled end of the panel when the cover is closed and which retains the filled end in engagement with the end of the base 9.

A tubular portion 13 of the base 9 provides a sufficient volume to serve as an accumulator and also provides a housing for the working elements of the pressure sensing and panel inflating members. Air under pressure is furnished to the fixture through a tube 14 connected by a conventional tube fitting 15 to an end fitting 16 which is a sliding fit in the tubular portion 13 of the base 9 and is made gastight by an O-ring seal 17. A retaining ring 18 is received in an annular groove in the tubular portion 13 to resist displacement of the end fitting. A pressure input tube 19 extends between the end fitting 16 and a valve body 20 and serves to carry air through the center of the tubular portion 13 to the control valve.

Within the valve body 20 there has been provided a thin rubber diaphragm 21, a plurality of accumulator ports 22, and a centrally disposed piston port fitting 23 which is provided with O-ring seals 24 and 25, to provide gastight joints between the piston port fitting 23 and the valve body 20 and tubular bore portion 13. When air is supplied through the tube 14 it passes into the valve body and the rubber diaphragm 21 flexes sufficiently to permit air to pass around the edges of the diaphragm and, through the accumulator ports 22, to pressurize the accumulator. At the same time, the rubber diaphragm is urged into closer engagement with the piston port fitting 23 and air does not escape therethrough. However, in the event of any sudden decrease of pressure in the supply tube 14, the differential in pressure existing across the diaphragm flexes the diaphragm back against the valve body fitting and opens the centrally disposed piston port. As a result, the charge of air in the accumulator passes back through the accumulator ports 22 and is dumped through the piston port fitting 23.

A retaining ring 26 supports the piston port fitting and valve body against longitudinal displacement in tubular portion 13 and provides a stop limiting inward movement of a piston 27 which is slidable in the tubular portion 13 and is urged back against the retaining ring by a return spring 28. Preferably the piston 27 is provided with an O-ring seal to avoid leakage around the piston.

A hollow inflating needle 29, centrally mounted in piston 27 is guided through a hole in a needle guide plate 30 which bears against a neoprene sealing boot 31 which surrounds the needle and is adapted to bear against that portion of the chemiluminescent panel which contains the form retaining filler. The sealing bot 31 and the needle guide plate 30 are held in the tubular portion 13 by retaining rings 32 which are received in annular grooves in the tubular portion 13 of the body.

Whenever the charge of air in the accumulator is lumped through the piston port, the piston 27 is advanced against the spring and the needle is extended beyond the neoprene sealing boot to penetrate the envelope of the chemiluminescent panel and allow air from the accumulator to pass through the form retaining filler to spread throughout the panel and activate the chemiluminescent panel. Pressure inside the panel acts to hold it in engagement with the end of the neoprene sealing boot and to prevent the escape of gas through the needle hole around the outside of the needle or after its retraction.

The cover 11 may be providel with a transparent window, to permit the passage of a maximum amount of light, or it may be formed to define a substantially opaque background with transparent letters to serve as markers for exits and the like.

Figure 5:
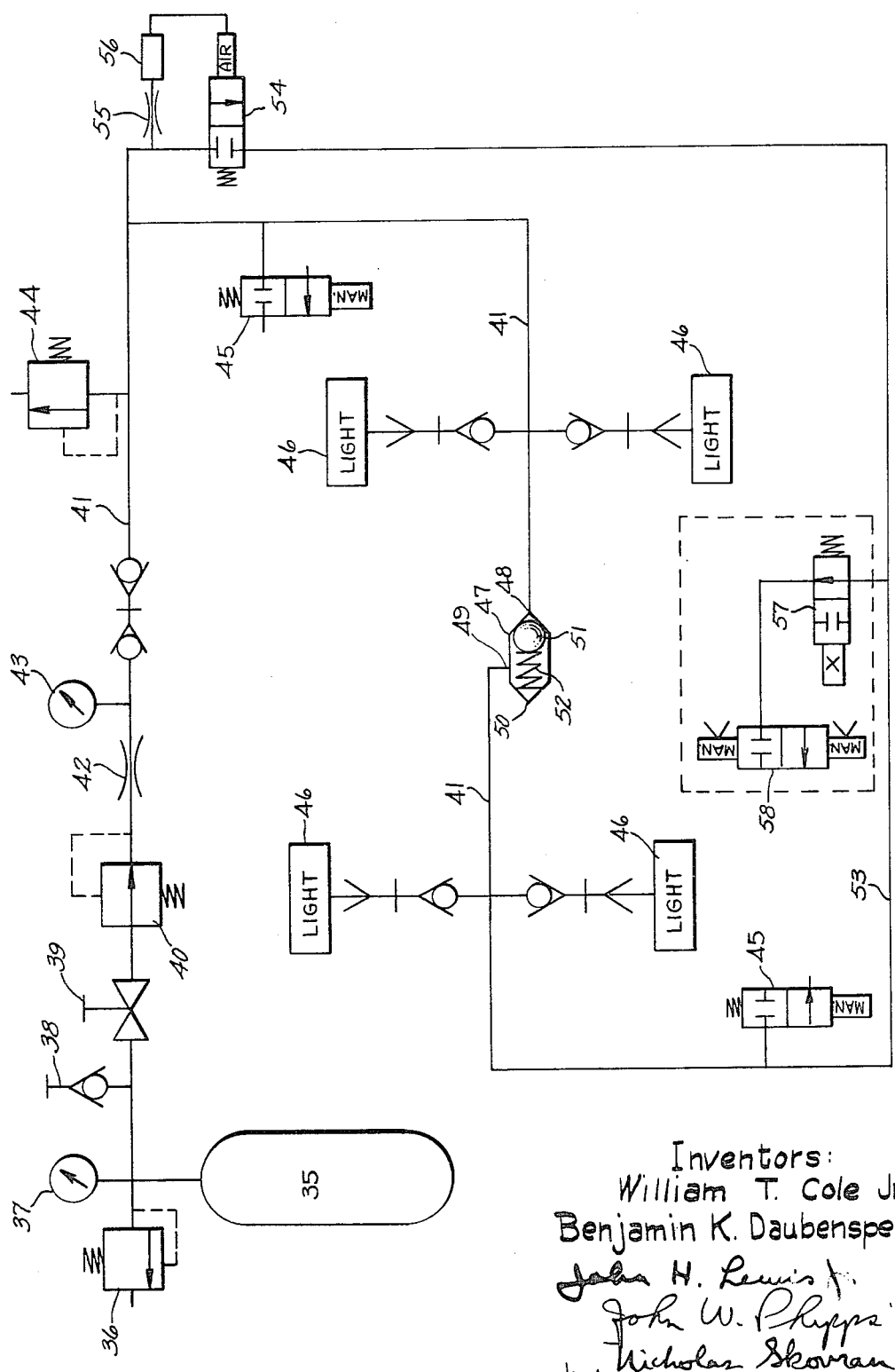
FIG. 5 is a schematic pneumatic circuit diagram of a typical installation.

Referring to FIG. 5, there is shown a schematic diagram of a pneumatic circuit which might be employed in a typical aircraft emergency lighting system to actuate a plurality of such panels. To provide an adequate supply of air for repeated actuation of the system and yet not occupy an excessive amount of space on the aircraft, it is desirable to provide a relatively small tank 35 in which the primary supply of air is stored at a relatively high pressure. In an illustrative embodiment, a tank of 100 cubic inches volume charged to 1800 p.s.i. has been a suitable source. Such a tank is preferably fitted with a pressure relief valve 36, pressure gage 37, filling valve 38 and shutoff valve 39. A pressure regulator 40 is utilized to maintain a regulated lower pressure, such as 100 p.s.i., in the main pressure line 41 interconnecting the lighting units and the actuating controls. Since the actuation of the control system depends upon a sudden depressurization of the main pressure line 41, we have provided a restrictor or small orifice 42 which prevents rapid repressurization of the main pressure line, and it is desirable to provide a gage 43 which permits continuous monitoring of the pressure existing in the main pressure line. Conveniently, this equipment and particularly the gages 37 and 43 may be locatel at or adjacent to the flight engineer's station. A pressure relief valve 44 is also desirable, to prevent the attainment of excessive pressure in the main presure line in the event of some malfunction of the regulator 40.

The main pressure line 41 is intended to be installed in the aircraft to interconnect all of the light panels and the controls therefor. Manual control may be provided by the opening or any one or more of the system dump valves 45 which conveniently are manually operated, spring return normally closed valves arranged upon manual movement to open position to discharge the main pressure line to ambient air.

Any number of light units 46 may be branched from the main pressure line, and each light unit will preferably embody the features illustrated in FIGS. 1, 2, 3 and 4, so that, as described in relation to those figures, any sudden release of pressure in the main pressure line will actuate the unit 46 by causing the advance of the inflating needle 29 to deliver air from the accumulator 13 to the interior of the plastic envelope 1.

Since a key feature of this system is the use of accumulators in each light unit which have sufficient capacity to actuate the unit, the main pressure line is not required to deliver air at high rates of flow and hence can be quite small and light in weight with obvious advantages in reducing the load on the aircraft and in improving the ease of installation. However, when very long lines are involved between the system dump valves and the more remote lighting units, the resistance to fluid flow in such a small line may interfere with the response of the remote unit for, as noted, they are intended to be actuated in response to rather sudden depressurization of the main pressure line. Dependable response of the remote lighting units results from the incorporation of quick exhaust valves 47 which may be of the type indicated generally in the schematic. Referring to the schematic, each quick exhaust valve 47 comprises a body formed with an inlet port 48, outlet port 49 and exhaust port 50. Within the valve body a valve ball 51 is resiliently urged as by a spring 52 toward the inlet port 48. Upon application of pressure to the main pressure line, the valve ball will be moved against the spring 52 to a position to close the exhaust port 50 and permit pressurization of the rest of the main pressure line through the outlet port 49. This condition will persist as long as steady pressure in the main pressure line exerts more force on the ball 51 than does the return spring 52. However, any sudden depressurization of the portion of the main pressure line between the quick exhaust valve and the main source of air will result in movement of the ball 51 to position to close the inlet port and leave the exhaust port in direct communication with the outlet port 49 to dump the pressure from all portions of the main pressure line downstream from the quick exhaust valve. With a plurality of such quick exhaust valves, positioned about every 25 feet on the main pressure line, assurance is provided that each section of the main pressure line will be discharged in turn and that individually they will be discharged suddenly enough to surely actuate the control in each individual lighting panel. Suitable commercially available quick exhaust valves may utilize a flexible flapper valve member as an equivalent of the ball shown in the schematic.

To assist in maintaining the air supply and to insure that the entire system will operate if a dump valve is operated or the main pressure line disrupted as by fire at a location downstream from the quick exhaust valves, it is desirable to close the loop of the main pressure line by returning the downstream end of the line to a position near the source of air. This may be done by the return line 53. The addition of the return line 53, however, creates a problem in the possibility that air might be supplied through the return line to some parts of the main pressure line downstream from the quick exhaust valves before pressure from the upstream end of the line has seated all of the quick exhaust valves to close the exhaust ports.

One means of solving this problem is to impose a time delay on the opening of the return line. This may conveniently be accomplished by placing a two-way, air pilot operated, spring return normally closed valve 54 in the connection between the return line and the pressure source and actuating the air pilot for this valve by air fed from the main pressure line through a throttling device or restrictor 55 and a volume or delay chamber 56. In this way, opening of the return line can be delayed long enough to insure that all of the quick exhaust valves have been shifted to hold the exhaust ports closed.

As previously noted, this system is readily adapted to automatic operation as an incident of failure of a hydraulic or pneumatic system, or failure of an electric system. One way to accomplish this is to connect to the main pressure line or return line, at any appropriate location, two-way pilot-operated spring return normally open valves 57, the pilot operator being a hydraulic or pneumatic pressure sensing device or a voltage sensing device connected to hold the valve in a closed position whenever the source it monitors is functioning normally. Since all these features will normally be inoperative when the aircraft is parked, it is desirable to back up the automatic valves with manually operated two-way manually opened, manually closed, detent retained valves 58. When these valves are manually moved to the closed position they will disable or "disarm" the automatic valve with which they are associated and conversely when manually moved to the open position the associated automatic valve will be "armed" or prepared to dump the pressure from the main pressure line in response to a failure of the function being monitored. Conveniently, these Arm-Disarm valves and the automatic valves which they monitor will be located at the flight engineer's station or readily accessible to him to insure that the automatic operators are "disarmed" before the engines are shut down and the aircraft parked.

Also, as previously noted, any fire or other catastrophe which severs the main pressure line at any point will result in actuation of all of the emergency lights, exit signs, etc., without requiring the intervention of any human operator.

Figure 6:
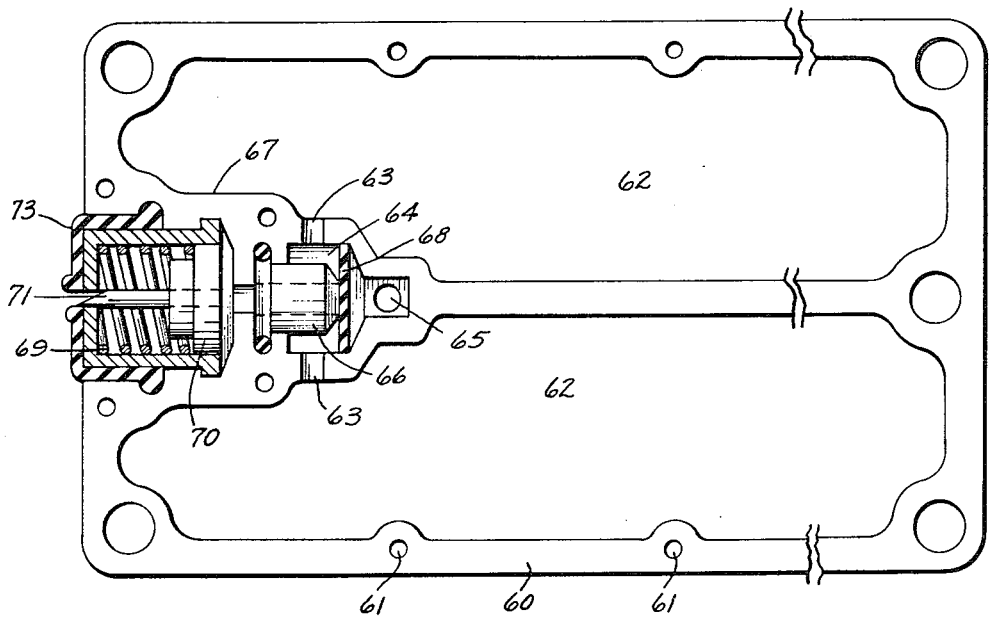
FIG. 6 is a plan view, partially in section, of an alternative arrangement of combination accumulator and panel inflation device.

FIG. 6 illustrates an alternative form of panel actuating device which is formed of two molded sections 60, which are mirror images of each other and may be of any conveniently molded or die cast plastic or metallic material. These sections when secured in face to face relation, as by screws 61 and suitable gaskets or sealing compound, provide a pair of accumulator chambers 62 each communicating through a port 63 with the interior of a valve chamber 64. A pressure input port 65 communicates through suitable fittings and tubing with the main pressure line of a system such as those described above and internally is in communication with the interior of the valve chamber 64. A molded valve insert 66 is supported in the other end of the valve chamber in opposition to the pressure input port and is centrally apertured to communicate with a barrel 67. Within the valve chamber a flexible diaphragm 68 of neoprene or other rubberlike material is interposed between the input port and the valve insert.

When air passage is supplied through the pressure input port diaphragm 68 is urged into engagement with the valve insert to close off the passage to the barrel, and the edges of the diaphragm are flexed sufficiently to allow air to pass into the valve chamber and through the ports into the two accumulator chambers. On any sudden decrease in pressure in the main pressure line or pressure input port, the diaphragm is urged in the other direction, to close off the pressure input port and open the passage through the valve insert to the barrel to discharge air from the accumulator chambers into the barrel. Within the barrel there is supported a piston return spring 69 and piston 70, the latter carrying a hollow inflation needle 71 which upon movement of the piston will be projected through an opening 72 in the end of the barrel 67. A sealing boot 73 of neoprene or other rubberlike material surrounds the barrel and is provided with a sealing rim which is in engagement with the plastic envelope 1 of the lighting panel shown in FIG. 1 so that on projection of the needle it penetrates into the filler 6 in the end of the panel.

Thus, in response to depressurization of the main pressure line, the accumulator chambers charges of air are discharged into the barrel, causing the piston and needle to advance to pierce the lighting panel and the charge of air to fill the panel to activate the chemiluminescent material therein. This unit is obviously adapted to function interchangeably with units such as are shown in the fixture illustrated in FIGS. 2, 3 and 4.

Figure 7:
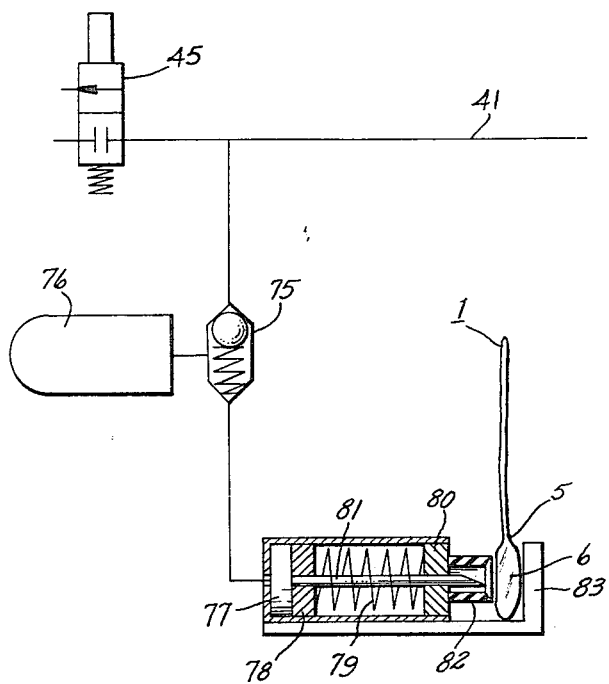
FIG. 7 is a schematic view, partially in section, showing an assembly of individual components to accomplish the purposes of the combined fixtures shown in FIGS. 2 and 6.

In the modification illustrated in FIG. 7, the lighting unit is arranged to be actuated from the main pressure line 41 by the action of manually operated system dump valves, the same as those previously described herein, and lighting units and controls therefor can be multiplied in accordance with the preceding disclosure. A quick exhaust valve 75, which may be of the type previously described herein relative to elongated main pressure lines, or any equivalent thereof, is connected between the main pressure line and the light source. Pressure from the main pressure line will force the valve element of the quick exhaust valve down against the resilient means to close off the exhaust outlet and to permit the pressure in the main pressure line to equalize in the pressure accumulator tank 76. On any sudden decrease in pressure in the main pressure line, as caused by manual opening of a system dump valve 45, the valve element in the quick exhaust valve shifts to close off the inlet port from the main pressure line and establish communication between the pressure accumulator tank 76 and the exhaust port of the valve, thus dumping the contents of the accumulator tank through the exhaust port. The exhaust port of the quick exhaust valve may be connected by suitable tubing to the cylinder 77 of a light actuating unit which may be mounted in any suitable fixture generally similar to those illustrated previously. Within cylinder 77 there is provided a piston 78 which is normally urged by a spring 79 engaging a guide bushing 80 to a position adjacent the inlet end of the cylinder.

A hollow needle 81 is secured in the piston and passes through an opening in the guide bushing and through a sealing boot 82. This arrangement is mounted in the fixture with the needle in opposition to form-retaining filler wad 6 in the end of the lighting panel 1. Obviously the fixture must be designed to provide an abutment 83 which supports the lighting panel in engagement with the end of the sealing boot.

When the actuation of a system dump valve causes the charge of air in the accumulator to be dumped into the cylinder 77 the piston 78 and needle 81 are advanced, causing the needle to penetrate into the porous filler in the lighting panel and fill the panel with air to activate the chemiluminescent material therein.

Although we have shown herein only a limited number of embodiments, it should be apparent that other embodiments or modifications are possible without departing from the spirit of the invention as defined in the claims appended hereto, to which reference should be made for determining the scope of our invention.

We claim:
1. An emergency lighting system, comprising at least one sealed transparent plastic envelope containing a chemiluminescent lighting unit which is activated by the admission of an activating gas and means for activating said unit comprising a supply of the activating gas, a gas accumulator immediately adjacent to the lighting unit, tubing interconnecting the supply of activating gas and the accumulator to charge said accumulator with the activating gas, normally closed valve means communicating with the accumulator and openable in response to loss of pressure in the supply or in the tubing to discharge the activating gas contained in the accumulator, and means to conduct said gas discharged from the accumulator into the interior of the sealed plastic envelope to activate the chemiluminescent lighting unit therein.

2. An emergency lighting system as defined in claim 1, said means to conduct said gas including a cylinder, a piston reciprocable in said cylinder, and a hollow needle mounted on and passing through said piston and advanced when said piston is moved by the discharge of gas from the accumulator to pierce the sealed envelope and to conduct the gas discharged from the accumulator into the plastic envelope.

3. An emergency lighting system as defined in claim 2, said sealed plastic envelope having contained within that portion of the envelope penetrated by the hollow needle a porous, form retaining filler adapted to separate the walls of the envelope and permit the needle to penetrate the near face thereof without penetrating the farther face thereof so that all of the gas discharged through the needle is discharged within the envelope.

4. An emergency lighting system as defined in claim 3, said valve means comprising a pressure responsive shiftable member which in a first position with said supply and said tubing pressurized blocks the discharge of gas from said accumulator to said envelope while permitting gas from said supply to pass into the accumulator and which in a second position after decrease of pressure in said tubing or said supply blocks the passage of gas from said supply into said accumulator and opens a path for the discharge of gas from said accumulator to said envelope.

5. An emergency lighting system as defined in claim 4, said pressure responsive shiftable member being normally held in said first position by the pressure of gas from said supply and responsive to greater pressure in said accumulator as compared to pressure in said supply and in the interconnecting lines to be moved by pressure in said accumulator to said second position.

6. An emergency lighting system as defined in claim 5, in which said valve means comprises a first port for the admission of gas from said supply and a second port for the passage of gas from said accumulator to said envelope and in which said pressure responsive shiftable member comprises a flexible diaphragm of rubberlike material which is shiftable from a first position in which said first port communicates with the accumulator and the second port is closed and a second position in which said second port communicates with the accumulator and the first port is closed.

7. A lighting fixture for use in an emergency lighting system as defined in claim 1, comprising a base having formed therein a chamber defining a pressure accumulator for the activating gas, a chamber for said valve means and a cover means for said base adapted to replaceably support and enclose said transparent plastic envelope in position to receive activating gas from said accumulator, said cover means being at least partially transparent to permit utilization of light from an activated envelope.

8. A lighting fixture as defined in claim 7, said base being formed with flanges adapted to overlay the edge portions of said plastic envelope and position same for enclosure by the cover means.

9. A lighting fixture as defined in claim 8, said means to conduct gas into said plastic envelope including a cylinder formed in said base, a piston in said cylinder and a hollow needle on said piston and advanced by the discharge of gas from said accumulator to pierce the plastic envelope and conduct the gas discharged from the accumulator into the plastic envelope.

10. A lighting fixture as defined in claim 9, said sealed plastic envelope having contained within that portion of the envelope penetrated by the hollow needle a porous form retaining filler adapted to separate the walls of the envelope and permit the needle to penetrate one face thereof without penetrating the farther face so that all of the gas discharged through the needle is discharged into the envelope, said cover being provided with an abutment which on closure of the cover positions and supports in opposition to the needle that portion of the envelope containing the filler.

References Cited

UNITED STATES PATENTS

| | | | |
|---|---|---|---|
| 3,354,828 | 11/1967 | Shefler et al. | 102—37.8 |
| 3,350,553 | 10/1967 | Cline | 240—2.25 |
| 3,265,877 | 8/1966 | Howell | 240—2.25 |
| 3,058,245 | 10/1962 | Pieters | 240—2.25 |

LELAND A. SEBASTIAN, Primary Examiner

U.S. Cl. X.R.

161—7, 45; 252—188.3

PO-1050
(5/69)

UNITED STATES PATENT OFFICE
CERTIFICATE OF CORRECTION

Patent No. 3,500,033      Dated March 10, 1970

Inventor(s) William T. Cole, Jr., and Benjamin K. Daubenspeck

It is certified that error appears in the above-identified patent and that said Letters Patent are hereby corrected as shown below:

Column 1, Line 45, "out" should be changed to --our--;
Column 2, Line 12, "an" should be changed to --any--;
Column 2, Line 70, after "terial," insert --a felted material--; Column 3, Line 75, "bot" should be changed to --boot--; Column 4, Line 5, "lumped" should be --dumped--;
Column 4, Line 57, after "each" insert --such--.

Signed and sealed this 18th day of August 1970.

(SEAL)
Attest:

EDWARD M. FLETCHER, JR.
Attesting Officer

WILLIAM E. SCHUYLER, JR.
Commissioner of Patents